(12) United States Patent
Choe et al.

(10) Patent No.: US 9,129,638 B1
(45) Date of Patent: Sep. 8, 2015

(54) HIGH PERFORMANCE PERPENDICULAR MAGNETIC GRANULAR MEDIA CONSISTING OF MULTIPLE EXCHANGE CONTROL LAYERS

(71) Applicant: HGST Netherlands B.V., Amsterdam (NL)

(72) Inventors: Gunn Choe, San Jose, CA (US); Yoshihiro Ikeda, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/603,258

(22) Filed: Jan. 22, 2015

(51) Int. Cl.
*G11B 11/00* (2006.01)
*G11B 11/105* (2006.01)
*G11B 5/66* (2006.01)
*G11B 5/667* (2006.01)

(52) U.S. Cl.
CPC ............ *G11B 11/10584* (2013.01); *G11B 5/66* (2013.01); *G11B 5/667* (2013.01); *G11B 11/10515* (2013.01)

(58) Field of Classification Search
None
See application file for complete search history.

(56) References Cited

U.S. PATENT DOCUMENTS

| | | | |
|---|---|---|---|
| 7,678,476 B2 | 3/2010 | Weller et al. | |
| 7,867,406 B2 | 1/2011 | Albrecht et al. | |
| 8,168,309 B2 * | 5/2012 | Choe et al. | 428/827 |
| 8,202,636 B2 | 6/2012 | Choe et al. | |
| 2009/0073599 A1 * | 3/2009 | Nemoto et al. | 360/77.02 |
| 2009/0086372 A1 * | 4/2009 | Ichihara et al. | 360/135 |
| 2010/0067149 A1 | 3/2010 | Bian et al. | |
| 2010/0159284 A1 * | 6/2010 | Choe et al. | 428/831 |
| 2010/0246060 A1 * | 9/2010 | Sasaki | 360/110 |
| 2010/0247962 A1 * | 9/2010 | Sasaki | 428/800 |
| 2012/0307395 A1 * | 12/2012 | Tonooka et al. | 360/75 |

OTHER PUBLICATIONS

Sonobe, Y., et al. "Coupled granular/continuous medium for thermally stable perpendicular magnetic recording" Journal of Magnetism and Magnetic Materials, vol. 235, No. 1, Oct. 2001, pp. 424-428.
Choe, Gunn et al., "Magnetic Switching Behavior of Granular Perpendicular Magnetic Media with Different Lateral and Vertical Exchange Coupling", IEEE Transactions on Magnetics, vol. 50, No. 11, Apr. 29, 2014, 4 pages.

* cited by examiner

*Primary Examiner* — Tan X Dinh
(74) *Attorney, Agent, or Firm* — Allerman Hall McCoy Russell & Tuttle LLP (57) ABSTRACT

A perpendicular magnetic recording media comprises a substrate, a first magnetic oxide layer, a first exchange control layer, a second magnetic oxide layer, a second exchange control layer, and a magnetic cap layer positioned above the substrate, in this order. The first magnetic oxide layer may have an anisotropy energy (Ku) between $6\times10^6$ and $8\times10^6$ erg/cm$^3$, and a magnetization (Ms) between 600 and 800 emu/cm$^3$. The second magnetic oxide layer may have a Ku between $5\times10^6$ and $8\times10^6$ erg/cm$^3$, and an Ms between 550 and 750 emu/cm$^3$. The first exchange control layer may have an Ms between 0 and 100 emu/cm$^3$. The second exchange control layer may have an Ms between 0 and 40 emu/cm$^3$.

20 Claims, 8 Drawing Sheets

| 28 | MC |
|---|---|
| 26 | ECL3 |
| 24 | MOL3 |
| 22 | ECL2 |
| 20 | MOL2 |
| 18 | ECL1 |
| 16 | MOL1 |
| 14 | UL |
| 12 | SB |

MC = Magnetic cap layer
ECL3 = Third exchange control layer
MOL3 = Third magnetic oxide layer
ECL2 = Second exchange control layer
MOL2 = Second magnetic oxide layer
ECL1 = First exchange control layer
MOL1 = First magnetic oxide layer
UL = Underlayer
SB = Substrate

| 28 | MC |
| 26 | ECL3 |
| 24 | MOL3 |
| 22 | ECL2 |
| 20 | MOL2 |
| 18 | ECL1 |
| 16 | MOL1 |
| 14 | UL |
| 12 | SB |

MC = Magnetic cap layer
ECL3 = Third exchange control layer
MOL3 = Third magnetic oxide layer
ECL2 = Second exchange control layer
MOL2 = Second magnetic oxide layer
ECL1 = First exchange control layer
MOL1 = First magnetic oxide layer
UL = Underlayer
SB = Substrate

HIGH PERFORMANCE PERPENDICULAR MAGNETIC GRANULAR MEDIA CONSISTING OF MULTIPLE EXCHANGE CONTROL LAYERS

BACKGROUND

In recent years, read and write heads of magnetic hard disk drives have become progressively smaller, data tracks on the magnetic disks of hard disk drives have become progressively narrower, and as a result, the areal density of stored data has increased. Advanced media designs such as exchange coupled composite (ECC) media and segmented media have been proposed by micro-magnetic modeling to further improve the writeability of high anisotropy Co grains. As track widths become narrower in high-areal density PMR recording, write head field strength and gradient start degrading, affecting media writeability. In order to sustain high areal density recording in PMR granular media, media writeability needs to be optimized for a narrow track head while maintaining low media noise and good thermal stability. One difficulty encountered is that, as the track head narrows, it is difficult to achieve thermal stability, media writeability, and low media noise in the same design. This is particularly true since design features that promote one of these characteristics may adversely affect another.

SUMMARY

To address the above described challenges, a perpendicular magnetic recording media is provided. The media may comprise a substrate, a first magnetic oxide layer, a first exchange control layer, a second magnetic oxide layer, a second exchange control layer, and a magnetic cap layer positioned above the substrate, in this order. The first magnetic oxide layer may have an anisotropy energy (Ku) between $6 \times 10^6$ and $8 \times 10^6$ erg/cm$^3$, and a magnetization (Ms) between 600 and 800 emu/cm$^3$. The second magnetic oxide layer may have a Ku between $5 \times 10^6$ and $8 \times 10^6$ erg/cm$^3$, and an Ms between 550 and 750 emu/cm$^3$. The first exchange control layer may have an Ms between 0 and 100 emu/cm$^3$. The second exchange control layer may have an Ms between 0 and 40 emu/cm$^3$.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
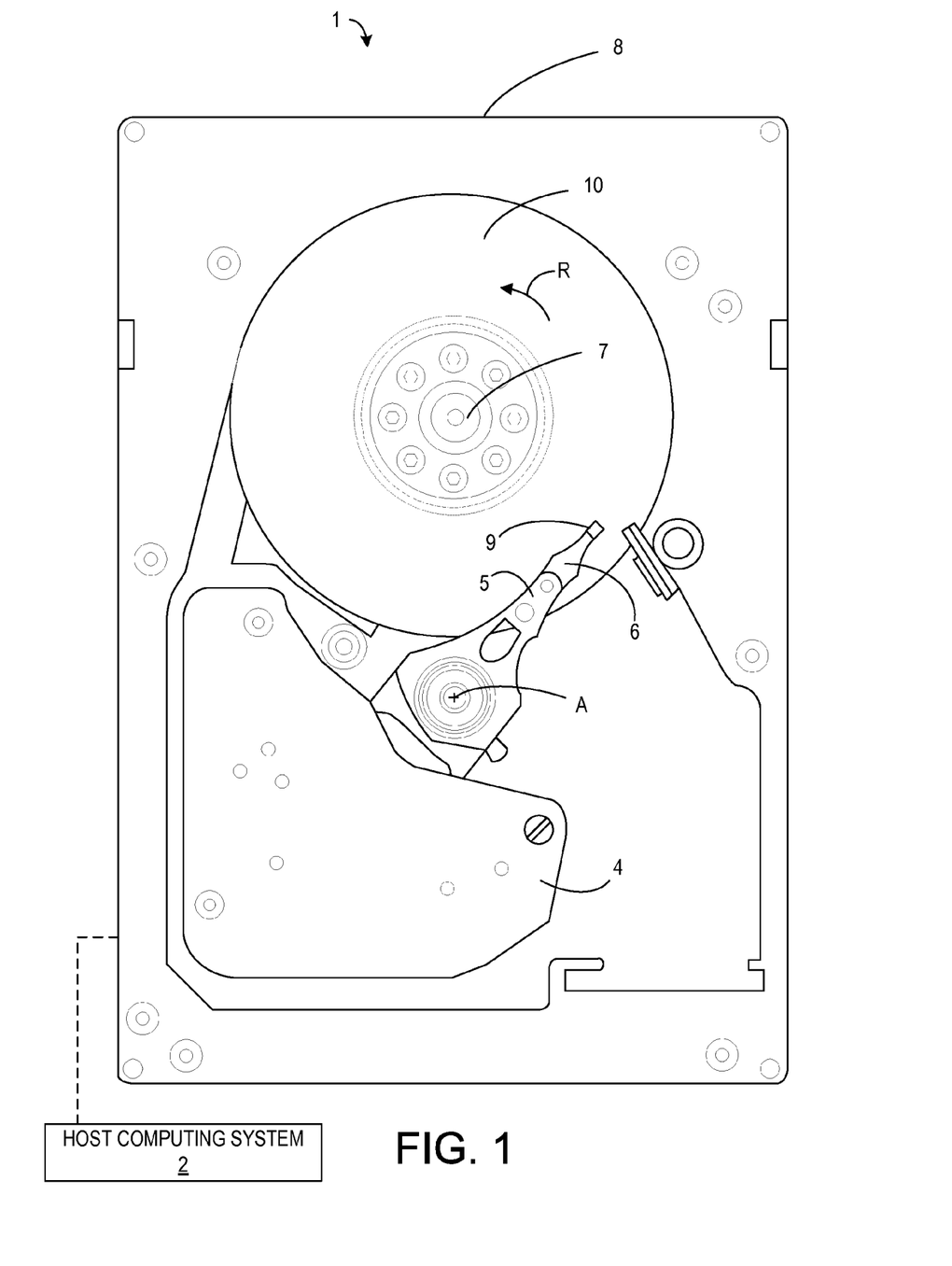
FIG. 1 illustrates an exemplary magnetic disk drive, according to one disclosed embodiment.
Figure 2:
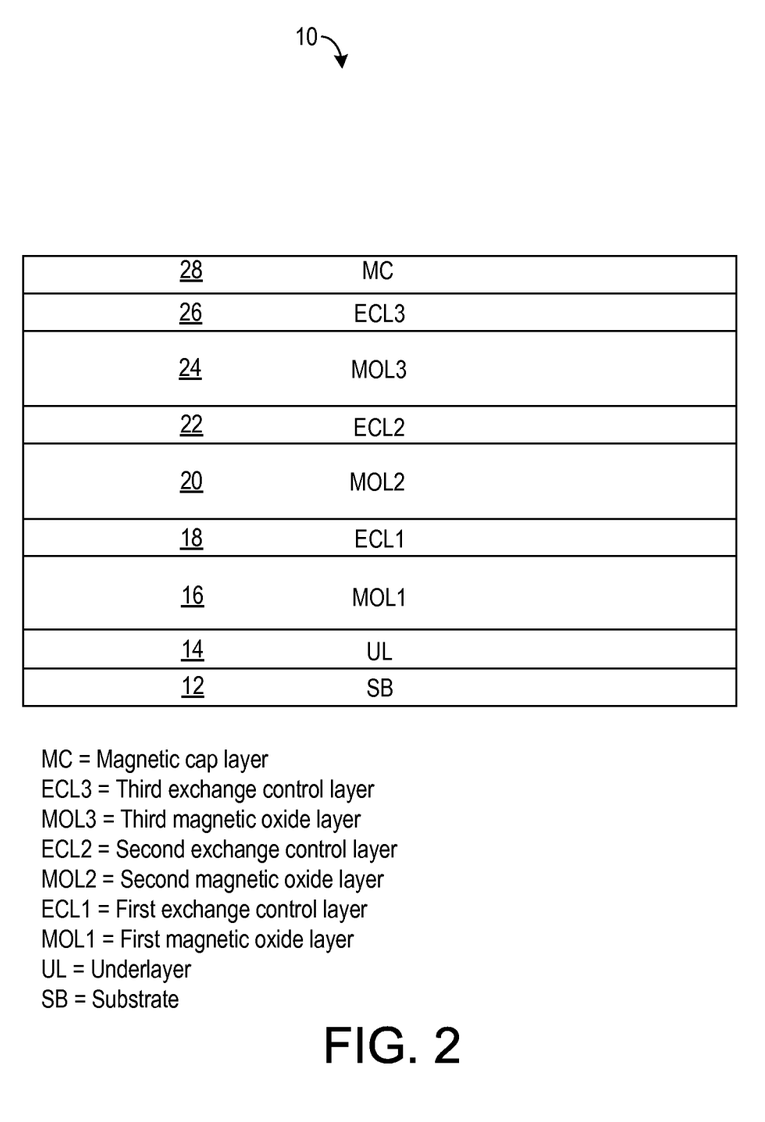
FIG. 2 is a schematic partial cross-sectional side view through a middle section of the perpendicular recording media, according to one disclosed embodiment.

The present disclosure is directed to a perpendicular magnetic recording media, an embodiment of which is shown in FIG. 2, for a magnetic recording system such as a disk drive as shown in FIG. 1. The perpendicular magnetic recording media includes alternating magnetic oxide and exchange control layers whose magnetization, anisotropy energy, and thickness values are optimized to maximize recording performance. The disk drive environment and the perpendicular magnetic recording media are described in turn below.

Turning initially to FIG. 1, this Figure illustrates a top view of an exemplary hard disk drive (HDD) 1, according to an embodiment of the disclosure. Hard disk drive (HDD) 1 is coupled to an associated host computing system 2, and is used to store information used by the computing system during processing. As illustrated, HDD 1 may include one or more perpendicular magnetic recording media 10, actuators 4, actuator arms 5, and suspension arms 6 associated with each of the perpendicular magnetic recording media 10, and a spindle motor 7 affixed in a chassis 8. The perpendicular magnetic recording media 10 may be arranged in a vertical stack, if more than one is provided. Moreover, the one or more perpendicular magnetic recording media 10 may be coupled with the spindle motor 7 for rotation in a rotation direction R.

Perpendicular magnetic recording media 10 may include tracks of data on both the top and bottom surfaces of the disk. A magnetic head mounted in a slider 9 may be positioned on a track. As each disk spins, data may be written on and/or read from the data track via a corresponding read head and write head of the recording head. The slider 9 and magnetic head contained therein may be coupled to an actuator arm 5 via a suspension arm 6. Actuator arm 5 may be configured to rotate about actuator axis A to place the magnetic head within slider 9 on a particular data track. It is to be understood that the actuator arm 5 alternatively may be configured to move in a manner other than swiveling around actuator axis A.

The suspension arm 6 biases the slider so that the slider bends towards the surface of the perpendicular magnetic recording media 10 when the disk 3 is not rotating. When the perpendicular magnetic recording media 10 rotates, air is swirled by the rotating disk 3 adjacent to a media facing surface (MFS) of the slider 9 causing the slider 9 to ride on an air bearing a slight distance from the surface of the rotating disk 3. For this reason, the MFS is also referred to as an air bearing surface (ABS). When the slider rides on the air bearing, the read and write heads are employed for reading and writing magnetic transitions corresponding to host data of the host computing system 2. The read and write heads are connected to signal processing circuitry that operates according to a computer program implemented in a processor or other logic circuitry integrated within or coupled to the HDD 1 to thereby implement the writing and reading functions.

FIG. 2 is a schematic partial cross-sectional view through a section of the perpendicular recording media 10 of the magnetic disk drive of FIG. 1. The perpendicular recording media comprises a substrate (SB) 12, an underlayer (UL) 14, a first magnetic oxide layer (MOL1) 16, a first exchange control layer (ECL1) 18, a second magnetic oxide layer (MOL2) 20, a second exchange control layer (ECL2) 22, a third magnetic oxide layer (MOL3), a third exchange control layer (ECL3), and a magnetic cap layer 28 positioned above the substrate, in this order. The magnetic oxide layers may include CoPtCr-oxide. The exchange control layers may include CoCrRuB-oxide. The magnetic cap layer may include CoPtCr. The underlayer (UL) 14 may include ruthenium and ruthenium oxide. The underlayer may further include AF coupled COFe-TaZr magnetic layers, and may also include a NiW alloy seed layer. The recording performance of the perpendicular magnetic recording media, as evaluated by measurements such as bit error rate (BER), signal-to-noise ratio (SNR), overwrite (OW), and resolution, can be adjusted by optimizing the anisotropy energy (Ku) of the magnetic oxide layers and the magnetization (Ms) of the exchange control layers, as well as the thicknesses of each magnetic oxide layer and exchange control layer.

Figure 3:
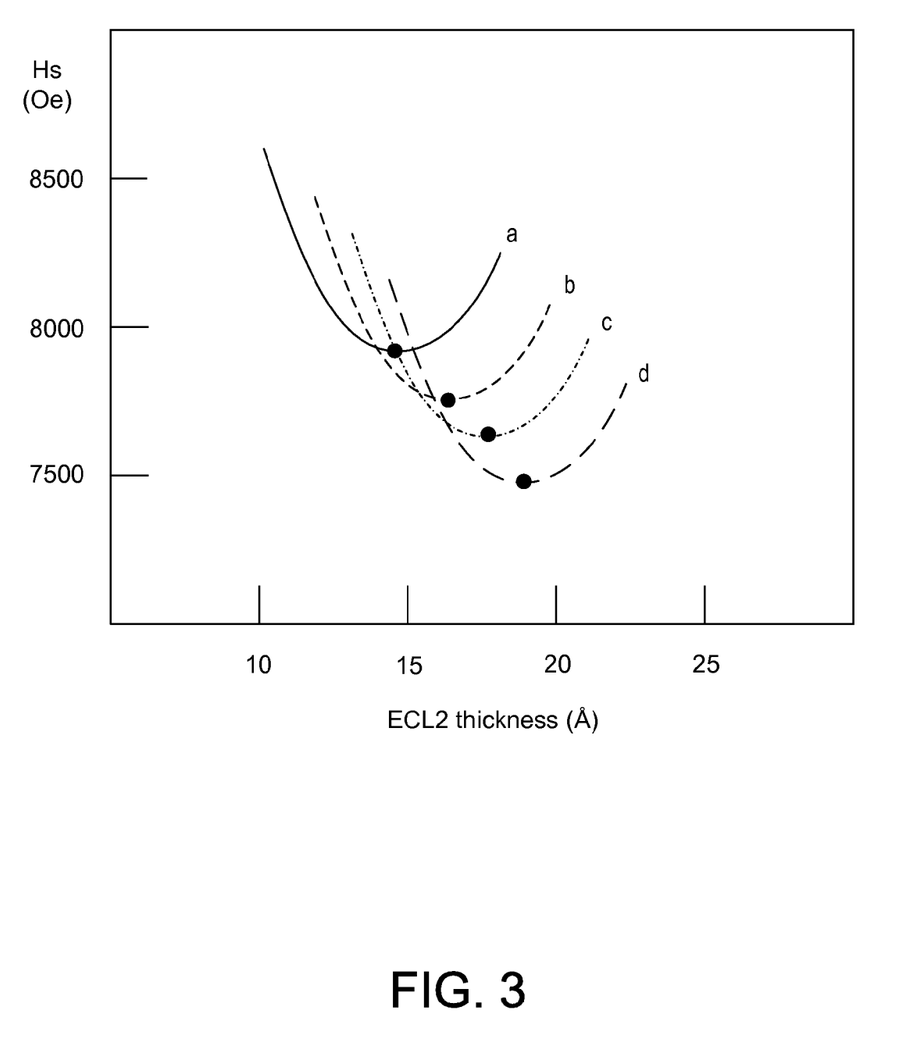
FIG. 3 is a plot illustrating the dependence of magnetic saturation field on the thickness of the second exchange control layer for different anisotropy energy values of the third magnetic oxide layer.

As shown in FIG. 3, the saturation field (Hs) of the perpendicular recording media is dependent on the thickness of the second exchange control layer (ECL2) and the anisotropy energy value (Ku) of the third magnetic oxide layer. Here, the relationship between the saturation field and the ECL2 thickness is depicted for the cases when the Ku of the third magnetic oxide layer is (a) $2 \times 10^6$ erg/cm$^3$, (b) $3.5 \times 10^6$ erg/cm$^3$, (c) $4.5 \times 10^6$ erg/cm$^3$, and (d) $6.5 \times 10^6$ erg/cm$^3$. For each saturation field curve, the dark dot represents the ECL2 thickness at which the saturation field achieves its minimum value $t(ECL)_{min,Hs}$. Below $t(ECL)_{min,Hs}$, Hs continues to decrease with increasing ECL2 thickness due to the low magnetization of the ECL2 layer that is strongly coupled to adjacent magnetic oxide layers. Above $t(ECL)_{min,Hs}$, independent switching of the upper and bottom oxide layers occurs due to the strong decoupling effect of the ECL2 layer, which results in an increase of Hs. For optimum media writeability, ECL2 thickness should be below $t(ECL)_{min,Hs}$ to avoid independent switching of the oxide layers through the ECL2 layer. Higher $t(ECL)_{min,Hs}$ values reflect a stronger vertical exchange coupling and can be achieved for a higher Ku of the second magnetic oxide layer. As the $t(ECL)_{min,Hs}$ value increases as the Ku of the second magnetic oxide layer increases, a thicker ECL2 layer can be used while maintaining the same amount of vertical coupling strength. It is generally desirable to increase the value of Ku for the magnetic oxide layers to maximize vertical exchange coupling and improve recording performance. Optimized for recording performance, the first magnetic oxide layer has an anisotropy energy (Ku) between $6 \times 10^6$ and $8 \times 10^6$ erg/cm$^3$ ($7 \times 10^6$ erg/cm$^3$ in some examples), and an magnetization (Ms) between 600 and 800 emu/cm$^3$ (700 emu/cm$^3$ in some examples). The second magnetic oxide layer has a Ku between $5 \times 10^6$ and $8 \times 10^6$ erg/cm$^3$ ($6 \times 10^6$ or $7 \times 10^6$ erg/cm$^3$ in some examples), and an Ms between 550 and 750 emu/cm$^3$ (between 600 and 700 emu/cm$^3$ in some examples). The third magnetic oxide layer has a Ku between $4 \times 10^6$ to $7.5 \times 10^6$ erg/cm$^3$ ($6 \times 10^6$ to $7 \times 10^6$ erg/cm$^3$ in some examples), and an Ms between 500 and 750 emu/cm$^3$ (600 to 700 emu/cm$^3$ in some examples). Thus, the anisotropy energies of the magnetic oxide in these ranges have the benefit of maximizing vertical exchange coupling, while also ensuring that the thickness of the exchange control layers does not compromise media resolution. In certain embodiments, the magnetic oxide layers may have a substantially equal thickness, which may also improve vertical exchange coupling.

Figure 4:
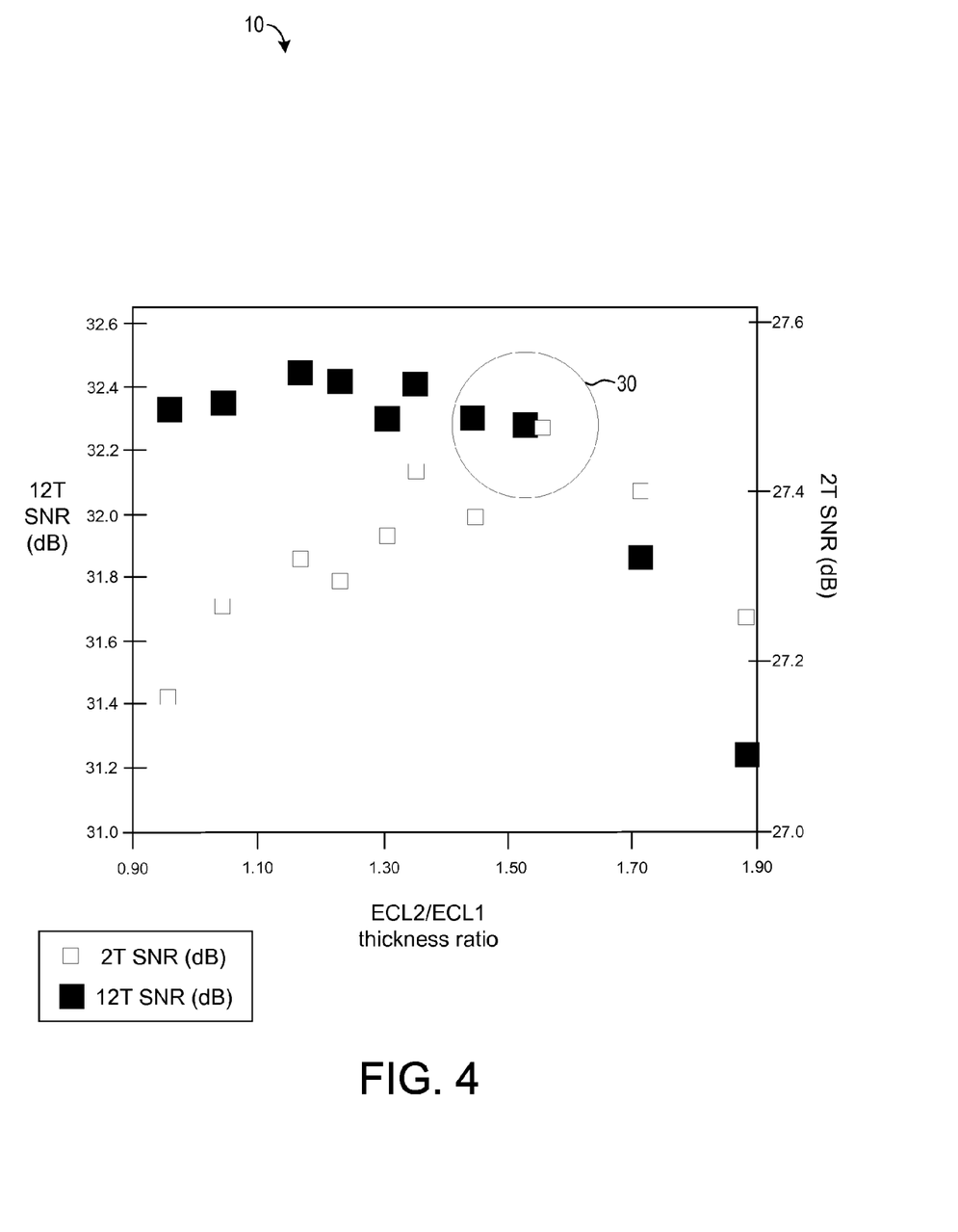
FIG. 4 is a plot illustrating the dependence of the signal-to-noise ratio on the thickness ratio of ECL2/ECL1 (second exchange control layer/first exchange control layer) for a media structure constructed in accordance with the invention.

Now referring to FIG. 4, the signal-to-noise ratio of the perpendicular recording media is dependent on the ratio of the thickness of the second exchange control layer (ECL2) to the thickness of the first exchange control layer (ECL1). In this example, the Ku of the third magnetic oxide layer was kept constant at approximately $3.5 \times 10^6$ erg/cm$^3$ while the thicknesses of ECL2 and ECL1 were adjusted to keep the coercivity of the magnetic oxide layers the same while the ECL2/ECL1 thickness ratio was changed. 2T SNR represents media performance at a high recording density, while 12T SNR represents media performance at a low recording density, or a density that is six times lower than 2T SNR. At the optimum range 30, the 2T SNR and 12T SNR both reach their peaks at the same ECL2/ECL1 ratio. Thus, the optimum thickness ratio of the second exchange control layer to the first exchange control layer (ECL2/ECL1) is between 1.4 and 1.6, and in some examples between 1.45 and 1.55; values in this range have the benefit of maximizing signal-to-noise ratio for multiple recording densities, including 2T and 12T.

Figure 5:
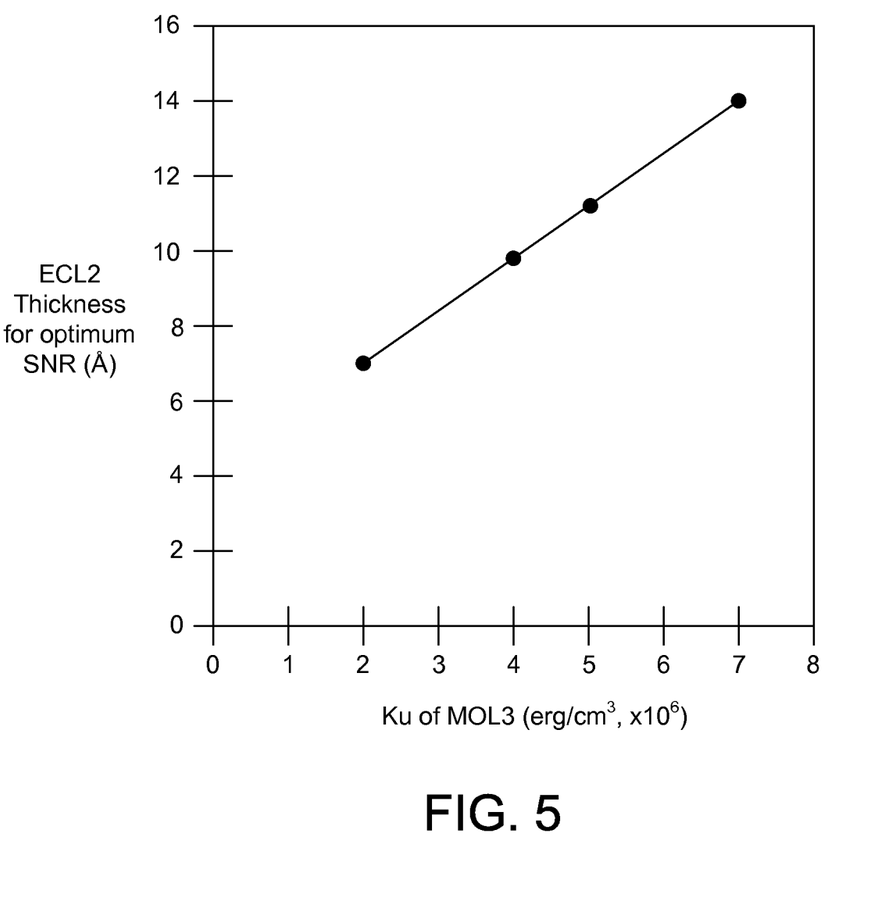
FIG. 5 is a plot illustrating the dependence of the thickness of the second exchange control layer for optimum signal-to-noise ratio on the Ku of the third magnetic oxide layer.

Now referring to FIG. 5, the thickness of the second exchange control layer for optimum signal-to-noise ratio is dependent on the Ku of the third magnetic oxide layer. As the linear relationship indicates, the higher the Ku value of the third magnetic oxide layer is, the thicker the second exchange control layer needs to be to achieve a good signal-to-noise ratio. However, the thicker the second exchange control layer is, the lower the media resolution becomes due to weak magnetization. Accordingly, the inventors have conceived of structures that strike a balance between maximizing the value of Ku for the magnetic oxide layers to increase vertical exchange coupling and controlling the thickness of the magnetic oxide layers to preserve media resolution.

Figure 6:
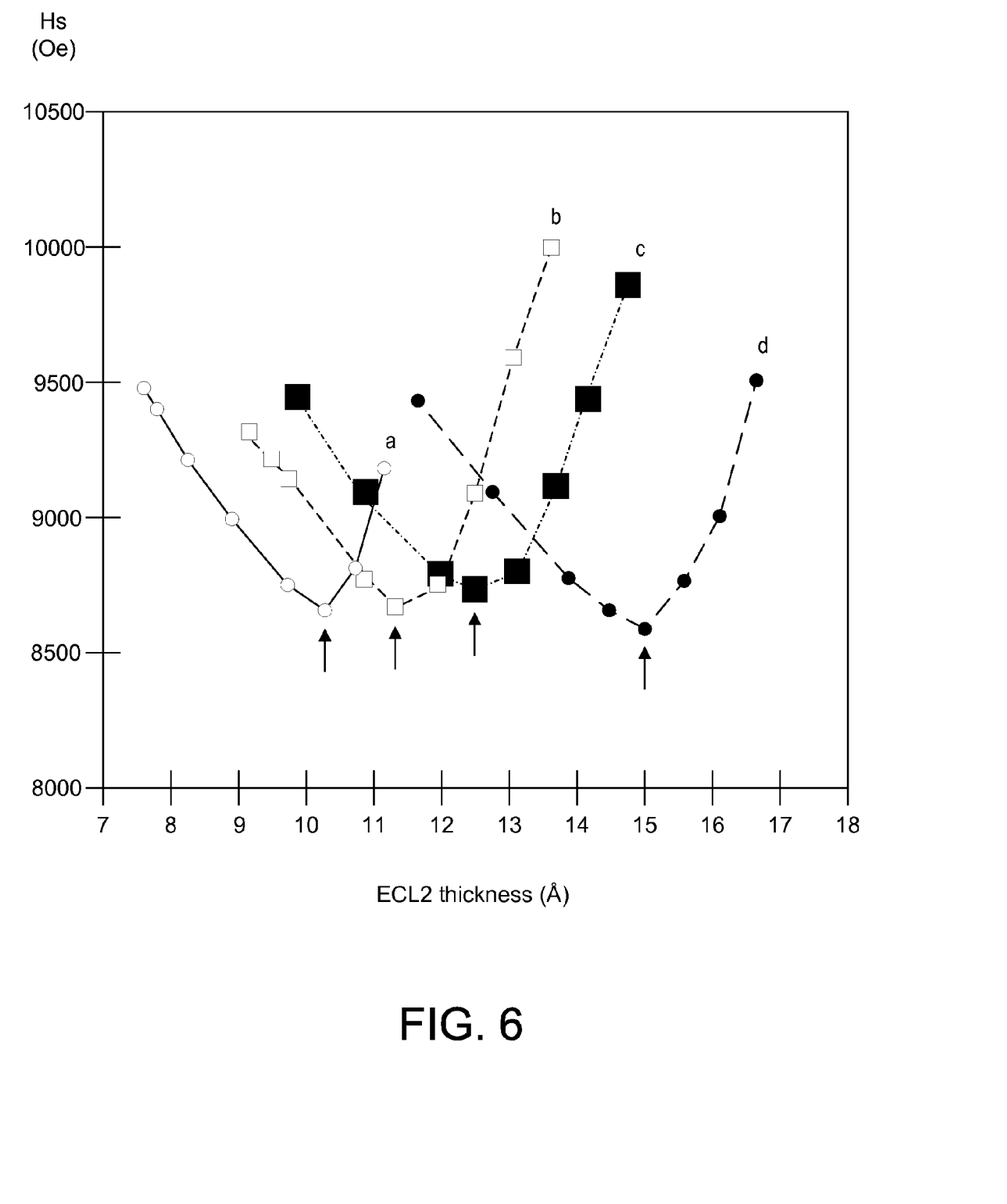
FIG. 6 is a plot illustrating the dependence of the magnetic saturation field on the thickness of the second exchange control layer for different magnetization (Ms) values of the second exchange control layer.

Now referring to FIG. 6, the saturation field (Hs) of the perpendicular recording media is dependent on the thickness and magnetization of the second exchange control layer (ECL2). In this example, the Ku of the third magnetic oxide layer was kept constant at approximately $4.5 \times 10^6$ erg/cm$^3$ while the thickness of ECL2 was adjusted. Here, the relationship between the saturation field and the ECL2 thickness is depicted for the cases when the Ms of the second exchange control layer is (a) 10 emu/cm$^3$, (b) 40 emu/cm$^3$, (c) 70 emu/cm$^3$, and (d) 100 emu/cm$^3$. For each saturation field curve, the dark arrow represents the ECL2 thickness at which the saturation field achieves its minimum value $t(ECL)_{min,Hs}$. Any ECL2 thickness value above $t(ECL)_{min,Hs}$ results in incoherent switching, while any ECL2 thickness value below $t(ECL)_{min,Hs}$ results in coherent switching. Lower $t(ECL)_{min,Hs}$ values reflect a stronger vertical exchange decoupling of the weaker magnetic ECL2 layer, which can improve the recording performance of the perpendicular recording media. Even when the ECL2 thickness is decreased, the media switching behavior can be maintained at a lower Ms value as $t(ECL)_{min\_Hs}$ shifts to a lower ECL thickness value, so that the ECL2 thickness can be reduced by more than 5 Å while the ECL Ms decreases by ~90 emu/cm³. Thus, the second exchange control layer has an optimal Ms between 0 and 40 emu/cm³ (0 and 20 emu/cm³ in some examples); values in this range have the benefit of maximizing the vertical exchange decoupling of the second exchange control layer. Additionally, the third exchange control layer has an optimal Ms between 0 and 100 emu/cm³; values in this range have a similar benefit.

Figure 7:
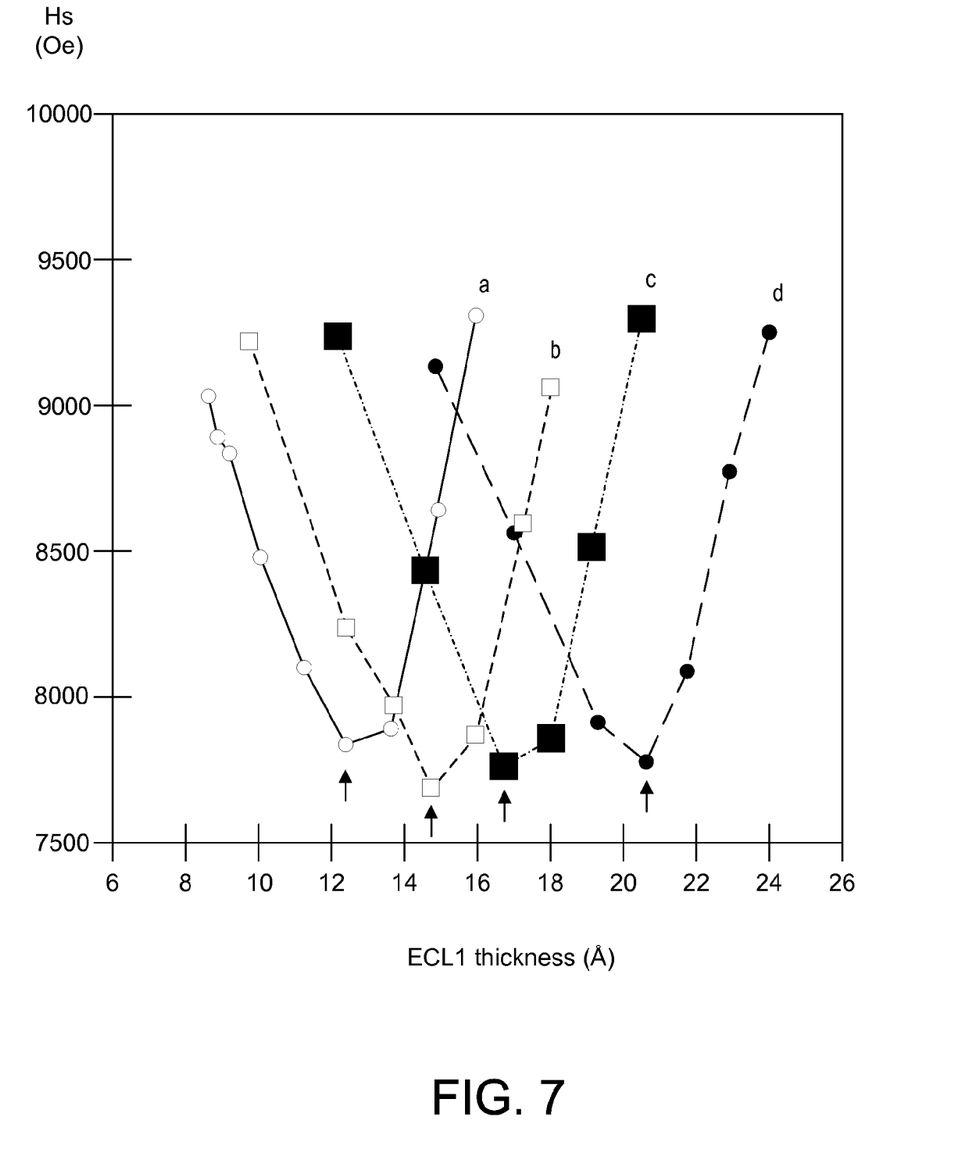
FIG. 7 is a plot illustrating the dependence of the magnetic saturation field on the thickness of the first exchange control layer for different magnetization (Ms) values of the first exchange control layer.

Now referring to FIG. 7, the saturation field (Hs) of the perpendicular recording media is also dependent on the thickness and magnetization of the first exchange control layer (ECL1). In this example, the Ku of the third magnetic oxide layer was kept constant at approximately 4.5×10⁶ erg/cm³ and the Ku of the second magnetic oxide layer was kept constant at approximately 6.0×10⁶ erg/cm³ while the thickness of ECL1 was adjusted. Here, the relationship between the saturation field and the ECL1 thickness is depicted for the cases when the Ms of the first exchange control layer is (a) 40 emu/cm³, (b) 70 emu/cm³, (c) 100 emu/cm³, and (d) 120 emu/cm³. For each saturation field curve, the dark arrow represents the ECL1 thickness at which the saturation field achieves its minimum value $t(ECL)_{min\_Hs}$. Below $t(ECL)_{min\_Hs}$, Hs continues to decrease with increasing ECL1 thickness due to the low magnetization of the ECL 1 layer that is strongly coupled to adjacent magnetic oxide layers. Above $t(ECL)_{min\_Hs}$, independent switching of the upper and bottom oxide layers occurs due to the strong decoupling effect of the ECL1 layer, which results in an increase of Hs. For optimum media writeability, ECL1 thickness should be below $t(ECL)_{min\_Hs}$ to avoid independent switching of the oxide layers through the ECL1 layer. Lower $t(ECL)_{min\_Hs}$ values reflect a stronger vertical exchange decoupling of the weaker magnetic ECL1 layer. Even when the ECL1 thickness is decreased, the media switching behavior can be maintained at a lower Ms value as $t(ECL)_{min\_Hs}$ shifts to a lower ECL thickness value. Thus, the first exchange control layer has an optimal Ms between 0 and 100 emu/cm³ (0 and 50 emu/cm³ in some examples); values in this range have the benefit of maximizing the vertical decoupling of the first exchange control layer, and this Ms range results in a thickness less than 10 Å (less than 8 Å in some examples) of the first exchange control layer. Thus, as demonstrated in FIGS. 6 and 7, it is generally desirable to decrease the value of Ms for the exchange control layers to maximize vertical exchange decoupling and improve recording performance. Furthermore, an enhanced vertical exchange coupling of the magnetic oxide layers can be combined with an enhanced vertical exchange decoupling of the exchange control layers to improve the signal-to-noise ratio of the perpendicular magnetic recording media.

Figure 8:
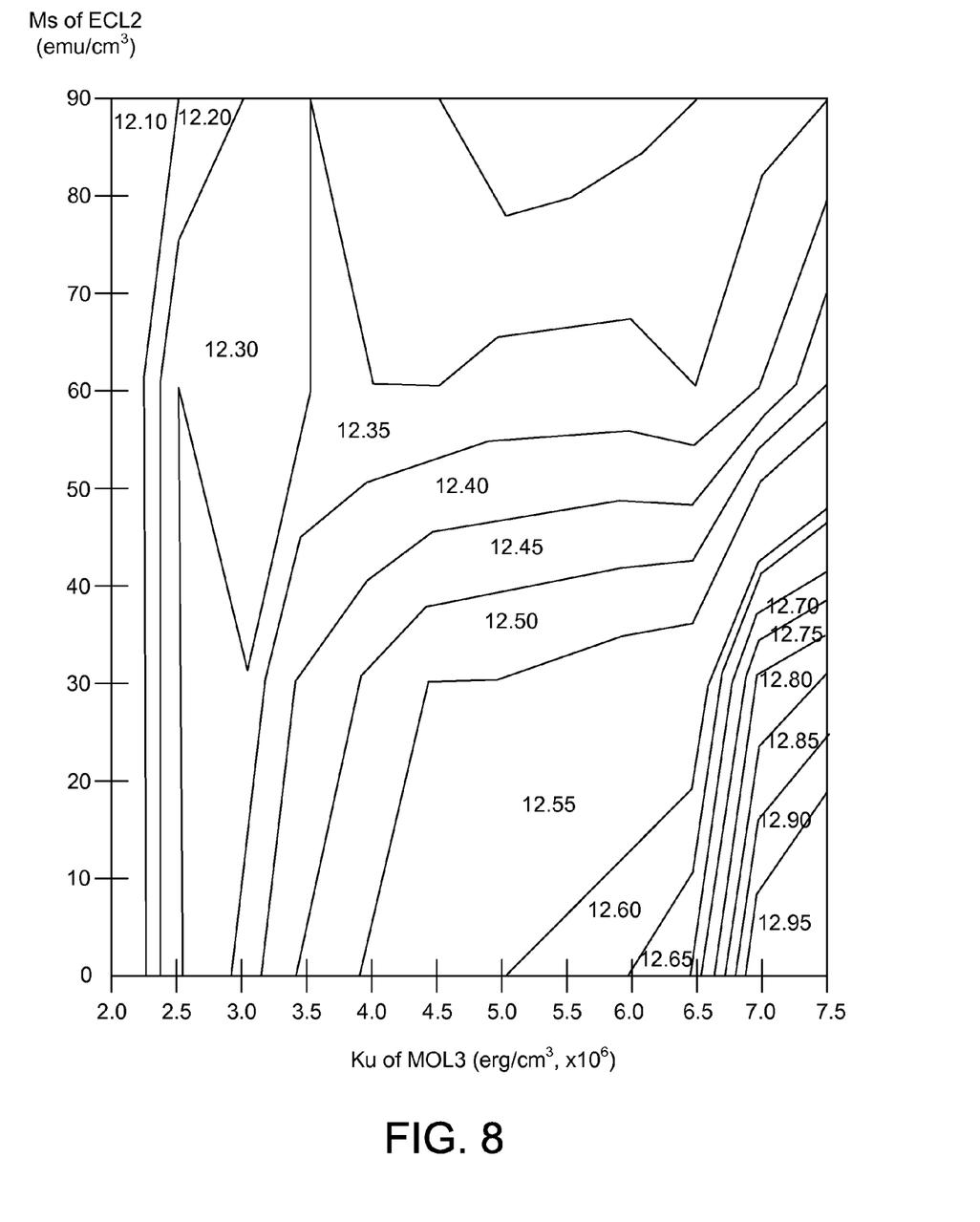
FIG. 8 is a contour plot illustrating the dependence of the signal-to-noise ratio (dB) on both the anisotropy energy (Ku) value of the third magnetic oxide layer and the magnetization (Ms) value of the second exchange control layer.

FIG. 8 summarizes the dependence of the signal-to-noise ratio of the perpendicular recording media on both the anisotropy energy (Ku oxide) of the third magnetic oxide layer (MOL3) and the magnetization (Ms ECL) of the second exchange control layer (ECL2). It is clearly demonstrated that a recording media with a higher Ku oxide and lower Ms ECL achieves better signal-to-noise ratio than a recording media with a lower Ku oxide and higher Ms ECL. Corresponding to the lower right area of the contour diagram, the second exchange control layer has an optimal Ms between 0 and 40 emu/cm³, while the third magnetic oxide layer has an optimal Ku between 4×10⁶ and 7.5×10⁶ erg/cm³. It will be appreciated that the optimal conditions may not necessarily be the absolute highest Ku oxide and the absolute lowest Ms ECL, as elevated Ku oxide may result in excessive MOL thickness, which may compromise resolution.

The novel media structure disclosed herein, consisting of multiple ECL and oxide layers, can provide better signal-to-noise ratio and writeability through the optimization of oxide Ku and ECL Ms, so that the oxide Ku is elevated while the ECL Ms and ECL thickness are decreased, as demonstrated in the following Tables 1 and 2. The magnetic oxide layers and exchange control layers are configured to provide the perpendicular recording media with a recording performance such that +0.9 order bit error rate, +0.8 dB signal-to-noise ratio, +1.8 dB overwrite, and +1.5% resolution are achieved, as well as a media writeability of between 35 and 37 dB of overwrite. The perpendicular magnetic recording media is also configured so that a product KuV/kT between 92 and 95 is achieved for the second magnetic oxide layer, where Ku is an anisotropy energy of the second magnetic oxide layer, V is a volume of magnetic grains in the second magnetic oxide layer, k is Boltzman's constant, and T is an absolute temperature of the second magnetic oxide layer at storage temperatures, providing a desirable thermal stability. Media switching behavior is optimized for a narrow track head field, which improves writeability as well as media noise. The physical thickness of the total magnetic stacks can be reduced, resulting in higher resolution.

TABLE 1

| Ku MOL3 | Ms ECL2 | ECL2 thickness | BER | Thermal stability | 2T SNR | Res | OW |
|---|---|---|---|---|---|---|---|
| 2.0 | 100 | 7.5 | −5.0 | 93 | 15.0 | 18.0 | 35.0 |
| 3.5 | 70 | 8.0 | −5.3 | 95 | 15.4 | 18.5 | 35.5 |
| 4.5 | 40 | 8.5 | −5.6 | 94 | 15.6 | 19.1 | 36.2 |
| 6.0 | 10 | 9.1 | −5.9 | 93 | 15.8 | 19.5 | 36.8 |

TABLE 2

| Ku MOL2 | Ms ECL1 | ECL1 thickness | BER | Thermal stability | 2T SNR | Res | OW |
|---|---|---|---|---|---|---|---|
| 5.5 | 120 | 10.3 | −5.6 | 94 | 15.6 | 19.1 | 36.2 |
| 5.5 | 100 | 10 | −5.6 | 92 | 15.7 | 19.2 | 36.2 |
| 6.0 | 70 | 9.5 | −5.7 | 94 | 15.9 | 19.5 | 37.0 |
| 7.0 | 40 | 9.1 | −5.8 | 95 | 16.1 | 19.7 | 37.5 |

Ku MOL2 = anisotropy energy of the second magnetic oxide layer (×10⁶ erg/cm³)
Ku MOL3 = anisotropy energy of the third magnetic oxide layer (×10⁶ erg/cm³)
Ms ECL1 = magnetization of the first exchange control layer (emu/cm³)
Ms ECL2 = magnetization of the second exchange control layer (emu/cm³)
BER = bit error rate (×10⁵)
Thermal stability = KuV/kT, where Ku is an anisotropy energy of the second magnetic oxide layer, V is a volume of magnetic grains in the second magnetic oxide layer, k is Boltzman's constant, and T is an absolute temperature of the second magnetic oxide layer at storage temperatures
2T SNR = Signal-to-noise ratio at high recording density (2T)
Res = media resolution (%), amplitude ratio at 2T and 6T recording conditions
OW = overwrite (dB)

It will be understood that the configurations and/or approaches described herein are exemplary in nature, and that these specific embodiments or examples are not to be considered in a limiting sense, because numerous variations are possible. The specific methods described herein include processes illustrated and/or described that may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A perpendicular recording media, comprising:
    a substrate;
    an underlayer, a first magnetic oxide layer, a first exchange control layer, a second magnetic oxide layer, a second exchange control layer, and a magnetic cap layer positioned above the substrate, in this order, wherein
    the first magnetic oxide layer has an anisotropy energy (Ku) between $6 \times 10^6$ and $8 \times 10^6$ erg/cm$^3$, and an magnetization (Ms) between 600 and 800 emu/cm$^3$;
    the second magnetic oxide layer has a Ku between $5 \times 10^6$ and $8 \times 10^6$ erg/cm$^3$, and an Ms between 550 and 750 emu/cm$^3$;
    the first exchange control layer has an Ms between 0 and 100 emu/cm$^3$; and
    the second exchange control layer has an Ms between 0 and 40 emu/cm$^3$.

2. The perpendicular recording media of claim 1, wherein:
    a third magnetic oxide layer is positioned above the second exchange control layer.

3. The perpendicular recording media of claim 2, wherein:
    a third exchange control layer is positioned above the third magnetic oxide layer.

4. The perpendicular recording media of claim 3, wherein:
    the third exchange control layer has an Ms between 0 and 100 emu/cm$^3$.

5. The perpendicular recording media of claim 2, wherein:
    the third magnetic oxide layer has a Ku between $4 \times 10^6$ and $7.5 \times 10^6$ erg/cm$^3$, and an Ms between 500 and 750 emu/cm$^3$.

6. The perpendicular recording media of claim 1, wherein:
    the first exchange control layer has a thickness less than 10 Å.

7. The perpendicular recording media of claim 1, wherein the underlayer includes at least one of ruthenium and ruthenium oxide.

8. The perpendicular recording media of claim 1, wherein the magnetic cap layer includes CoPtCr.

9. The perpendicular recording media of claim 1, wherein the magnetic oxide layers include CoPtCr-oxide.

10. The perpendicular recording media of claim 1, wherein the magnetic oxide layers have a substantially equal thickness.

11. The perpendicular recording media of claim 1, wherein the exchange control layers include CoCrRuB-oxide.

12. The perpendicular recording media of claim 1, wherein the exchange control layers have a substantially equal thickness.

13. The perpendicular recording media of claim 1, wherein a thickness ratio of the second exchange control layer to the first exchange control layer is between 1.4 and 1.6.

14. The perpendicular recording media of claim 1, wherein a product KuV/kT is between 92 and 95 for the second magnetic oxide layer, where Ku is an anisotropy energy of the second magnetic oxide layer, V is a volume of magnetic grains in the second magnetic oxide layer, k is Boltzman's constant, and T is an absolute temperature of the second magnetic oxide layer at storage temperatures.

15. The perpendicular recording media of claim 1, wherein the underlayer may further include AF coupled CoFeTaZr soft-magnetic layers.

16. The perpendicular recording media of claim 1, wherein the underlayer may further include a NiW alloy seed layer.

17. The perpendicular recording media of claim 1, wherein the magnetic oxide layers and the exchange control layers are configured to provide the perpendicular recording media with a media writeability of between 35 and 37 dB.

18. The perpendicular recording media of claim 1, wherein the magnetic oxide layers and exchange control layers are configured to provide the perpendicular recording media with a recording performance such that +0.9 order bit error rate, +0.8 dB signal-to-noise ratio, +1.8 dB overwrite, and +1.5% resolution are achieved.

19. A perpendicular recording media, comprising:
    a substrate;
    a first magnetic oxide layer, a first exchange control layer, a second magnetic oxide layer, a second exchange control layer, a third magnetic oxide layer, a third exchange control layer, and a magnetic cap layer positioned above the substrate, in this order, wherein
    the first magnetic oxide layer has an anisotropy energy (Ku) between $6 \times 10^6$ and $8 \times 10^6$ erg/cm$^3$, and an magnetization (Ms) between 600 and 800 emu/cm$^3$;
    the second magnetic oxide layer has a Ku between $5 \times 10^6$ and $8 \times 10^6$ erg/cm$^3$, and an Ms between 550 and 750 emu/cm$^3$;
    the third magnetic oxide layer has a Ku between $4 \times 10^6$ to $7.5 \times 10^6$ erg/cm$^3$, and an Ms between 500 and 750 emu/cm$^3$;
    the first exchange control layer has an Ms between 0 and 100 emu/cm$^3$;
    the second exchange control layer has an Ms between 0 and 40 emu/cm$^3$; and
    the third exchange control layer has an Ms between 0 and 100 emu/cm$^3$.

20. A perpendicular recording media, comprising:
    at least one underlayer;
    a substrate, a first magnetic oxide layer, a first exchange control layer, a second magnetic oxide layer, a second exchange control layer, a third magnetic oxide layer, a third exchange control layer, and a magnetic cap layer; wherein
    the first magnetic oxide layer has an anisotropy energy (Ku) between $6 \times 10^6$ and $8 \times 10^6$ erg/cm$^3$, and an magnetization (Ms) between 600 and 800 emu/cm$^3$;
    the second magnetic oxide layer has a Ku between $5 \times 10^6$ and $8 \times 10^6$ erg/cm$^3$, and an Ms between 550 and 750 emu/cm$^3$;
    the third magnetic oxide layer has a Ku between $4 \times 10^6$ to $7.5 \times 10^6$ erg/cm$^3$, and an Ms between 500 and 750 emu/cm$^3$;
    the first exchange control layer has an Ms between 0 and 100 emu/cm$^3$;
    the second exchange control layer has an Ms between 0 and 40 emu/cm$^3$;
    the third exchange control layer has an Ms between 0 and 100 emu/cm$^3$; and
    the first exchange control layer has a thickness less than 10 Å.

* * * * *